US012645710B2

(12) United States Patent
Fung Moo et al.

(10) Patent No.: US 12,645,710 B2
(45) Date of Patent: Jun. 2, 2026

(54) SYSTEMS AND METHODS FOR COLLECTING AND PROCESSING DATA FOR INSURANCE-RELATED TASKS

(71) Applicant: American Family Mutual Insurance Company, S.I., Madison, WI (US)

(72) Inventors: Glenn M. Fung Moo, Madison, WI (US); Devin M. Conathan, Madison, WI (US); Joseph P. Bockhorst, Madison, WI (US); Daniel A. Dickinson, Middleton, WI (US)

(73) Assignee: AMERICAN FAMILY MUTUAL INSURANCE COMPANY, S.I., Madison, WI (US)

( * ) Notice: Subject to any disclaimer, the term of this patent is extended or adjusted under 35 U.S.C. 154(b) by 803 days.

(21) Appl. No.: 17/085,615

(22) Filed: Oct. 30, 2020

(65) Prior Publication Data

US 2021/0201169 A1     Jul. 1, 2021

Related U.S. Application Data

(60) Provisional application No. 62/969,446, filed on Feb. 3, 2020, provisional application No. 62/928,814, filed on Oct. 31, 2019.

(51) Int. Cl.
*G06Q 40/00*        (2023.01)
*G06F 16/25*        (2019.01)
(Continued)

(52) U.S. Cl.
CPC .......... *G06F 16/289* (2019.01); *G06F 16/258* (2019.01); *G06F 16/3334* (2019.01); *G06Q 40/08* (2013.01); *G06Q 10/10* (2013.01)

(58) Field of Classification Search
None
See application file for complete search history.

(56) References Cited

U.S. PATENT DOCUMENTS 6,233,545 B1     5/2001  Datig
6,292,792 B1     9/2001  Baffes et al.
(Continued)

FOREIGN PATENT DOCUMENTS

EP          2950251 A1 * 12/2015  ............ G06Q 10/10
WO      2008130501      10/2008
WO      2018209254      11/2018

OTHER PUBLICATIONS

Machine Learning—What it is and my it matters, Nov. 27, 2018, SAS, printed through www.archive.org (Year: 2018).*

(Continued)

*Primary Examiner* — Naresh Vig
(74) *Attorney, Agent, or Firm* — Fitch, Even, Tabin & Flannery LLP

(57)          ABSTRACT

Provided herein are systems and methods for collecting and processing data to assist in the processing of insurance-related tasks. The systems and methods described herein may also be useful to guiding a user such as an insurance company representative through interactions according to formalized protocols. In some embodiments, systems and methods may be used to collect and process data associated with an episode such as interaction between a user and a third party. The system may be a data collection and processing system including a knowledge representation module having one or more knowledge graphs and parsing algorithms. The knowledge representation module may be used to process structured and unstructured data and to generate one or more prompts relating to data collection and processing.

20 Claims, 14 Drawing Sheets

(51) Int. Cl.

*G06F 16/28* (2019.01)
*G06F 16/3332* (2025.01)
*G06Q 40/08* (2012.01)
*G06Q 10/10* (2023.01)

(56) References Cited

U.S. PATENT DOCUMENTS

| | | | |
|---|---|---|---|
| 8,571,895 B1 * | 10/2013 | Medina, III | G06Q 40/08 |
| | | | 705/4 |
| 9,183,593 B2 | 11/2015 | Willis | |
| 9,189,742 B2 | 11/2015 | London | |
| 10,108,700 B2 | 10/2018 | Gupta et al. | |
| 10,496,754 B1 | 12/2019 | Ferrucci et al. | |
| 10,600,123 B1 * | 3/2020 | Medina, III | G06Q 40/08 |
| 10,664,572 B2 | 5/2020 | Bitran | |
| 10,885,591 B1 | 1/2021 | Bischoff | |
| 11,127,082 B1 * | 9/2021 | Gore | G06Q 40/08 |
| 2010/0131300 A1 | 5/2010 | Collopy | |
| 2016/0224637 A1 | 8/2016 | Sukumar et al. | |
| 2016/0239919 A1 | 8/2016 | Eder | |
| 2017/0230312 A1 | 8/2017 | Barrett et al. | |
| 2017/0329867 A1 | 11/2017 | Lindsley | |
| 2018/0052884 A1 | 2/2018 | Kale et al. | |
| 2018/0232658 A1 | 8/2018 | Acharya | |
| 2018/0315415 A1 | 11/2018 | Mosley et al. | |
| 2018/0330281 A1 | 11/2018 | Teller | |
| 2018/0336640 A1 | 11/2018 | Dziabiak | |
| 2018/0349511 A1 | 12/2018 | Kleiman-Weiner et al. | |
| 2019/0042988 A1 | 2/2019 | Brown et al. | |
| 2019/0080416 A1 | 3/2019 | Smith | |
| 2019/0236140 A1 | 8/2019 | Canim et al. | |
| 2020/0058381 A1 | 2/2020 | Patel | |
| 2020/0342221 A1 | 10/2020 | Sampath | |
| 2020/0357075 A1 | 11/2020 | Dahl | |
| 2020/0402117 A1 * | 12/2020 | Givens | G06Q 50/01 |

OTHER PUBLICATIONS

Lee et al., "Transfer Learning for Deep Learning on Graph-Structured Data", 2017, Association for Advancement of Artificial Intelligence (www.aaai.org), pp. 2154-2160 (Year: 2017).*
Introducing the knowledge graph, 2013, Google Corp (Year: 2013).*
Knowledge graph sizzle, 2015, Rovi (YouTube publisher) (Year: 2015).*
"What is an Enterprise Knowledge Graph and Why Do I want One?", Nov. 1, 2018, www. Enterprise-Knowledge.com (Year: 2018).*
Jim Webber, "Why Knowledge Graph are Foundational to Artificial Intelligence", Mar. 2, 2018, www.DataNami.com (Year: 2018).*
"The Arrival and Potential of Knowledge Graphs into Our World", May 15, 2018, www.paul4innovating.com, printed through www.archive.org (Year: 2018).*
Brian Ludlow published article "Recovering Loss of Revenue from 'not at fault' Accidents", May 30, 2018, Ambulance.org (Year: 2017).*

"Model User Guide for Implementing Online Insurance Verification", Jan. 2017, Insurance Industry Committee on Motor Vehicle Administration (Year: 2017).*
RootBlog published article "Filing a claim with Root is easy—right when you need it to be", Aug. 27, 2018, www.JoinRoot.com (Year: 2018).*
Eckert et al., "How digitalization affects insurance companies: overview and use cases of digital technologies," Die Zeitschrift für die gesamte Versicherungswissenschaft, 2020, vol. 109, pp. 333-360.
Zappa et al., "Text Mining In Insurance: From Unstructured Data To Meaning," 2019 (30 pages).
Berant et al., "Semantic Parsing on Freebase from Question-Answer Pairs," Proceedings of the 2013 Conference on Empirical Methods in Natural Language Processing, pp. 1533-1544.
Bockhorst et al., "Knowledge Graph-Driven Conversational Agents," 33rd Conference on Neural Information Processing Systems, 2019 (12 pages).
Bockhorst et al., "Probabilistic-Logic Bots for Efficient Evaluation of Business Rules Using Conversational Interfaces," The Thirty-First AAAI Conference on Innovative Applications of Artificial Intelligence (IAAI-19), pp. 9422-9427.
Einolghozati et al., "Improving Semantic Parsing for Task Oriented Dialog," 32nd Conference on Neural Information Processing Systems, 2018 (9 pages).
Gupta et al., "Semantic Parsing for Task Oriented Dialog using Hierarchical Representations," Proceedings of the 2018 Conference on Empirical Methods in Natural Language Processing, pp. 2787-2792.
Hannun et al., "Deep Speech: Scaling up end-to-end speech recognition" (12 pages).
Iyyer et al., "Search-based Neural Structured Learning for Sequential Question Answering," Proceedings of the 55th Annual Meeting of the Association for Computational Linguistics, 2017, pp. 1821-1831.
Kim, "Convolutional Neural Networks for Sentence Classification" (6 pages).
Leu et al., "A Multi-Disciplinary Review of Knowledge Acquisition Methods: From Human to Autonomous Eliciting Agents," 2018 (25 pages).
Mozilla. 2019, A tensorflow implementation of baidu's deepspeech architecture, https://github.com/mozilla/DeepSpeech, accessed on Jan. 29, 2021.
Pennington et al., "GloVe: Global Vectors forWord Representation," Proceedings of the 2014 Conference on Empirical Methods in Natural Language Processing (EMNLP), pp. 1532-1543.
Snidaro et al., "Recent Trends in Context Exploitation for Information Fusion and AI," AI Magazine, vol. 40, No. 3, 2019 (18 pages).
Sun et al., "Knowledge-Aware Conversational Semantic Parsing Over Web Tables," (9 pages).
Wang et al., "Building a Semantic Parser Overnight," Proceedings of the 53rd Annual Meeting of the Association for Computational Linguistics and the 7th International Joint Conference on Natural Language Processing, 2015, pp. 1332-1342.
Yao et al., "Interactive Semantic Parsing for If-Then Recipes via Hierarchical Reinforcement Learning," The Thirty-Third AAAI Conference on Artificial Intelligence (AAAI-19), pp. 2547-2554.

* cited by examiner

300

Create rule / information / knowledge representation module — 305

Execute rule / information / knowledge representation module — 310

Update rule / information / knowledge representation module, routinely, based on execution — 315

*FIG. 4*

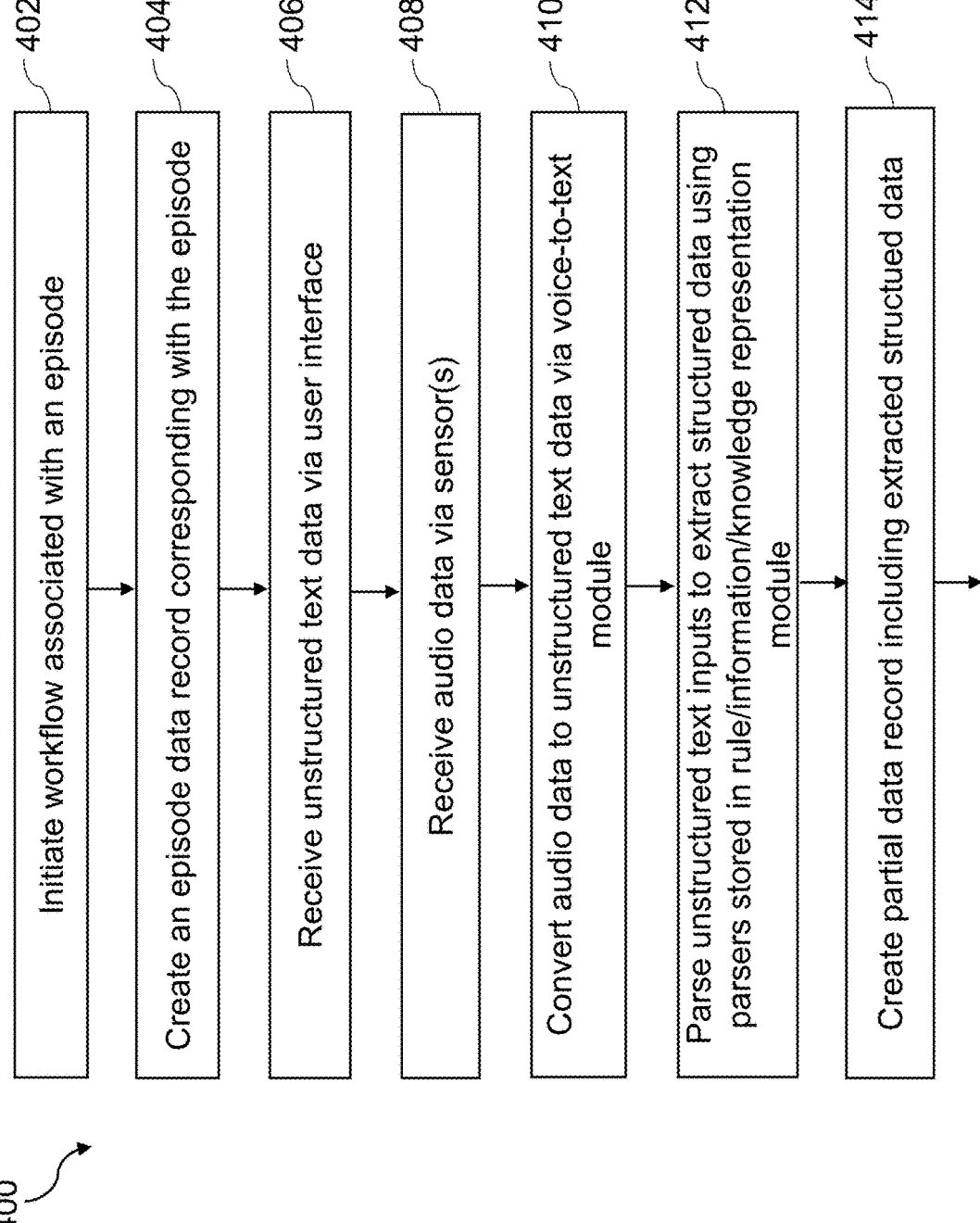

400

402 — Initiate workflow associated with an episode

404 — Create an episode data record corresponding with the episode

406 — Receive unstructured text data via user interface

408 — Receive audio data via sensor(s)

410 — Convert audio data to unstructured text data via voice-to-text module

412 — Parse unstructured text inputs to extract structured data using parsers stored in rule/information/knowledge representation module 414 — Create partial data record including extracted structued data

*FIG. 4 (cont'd)*

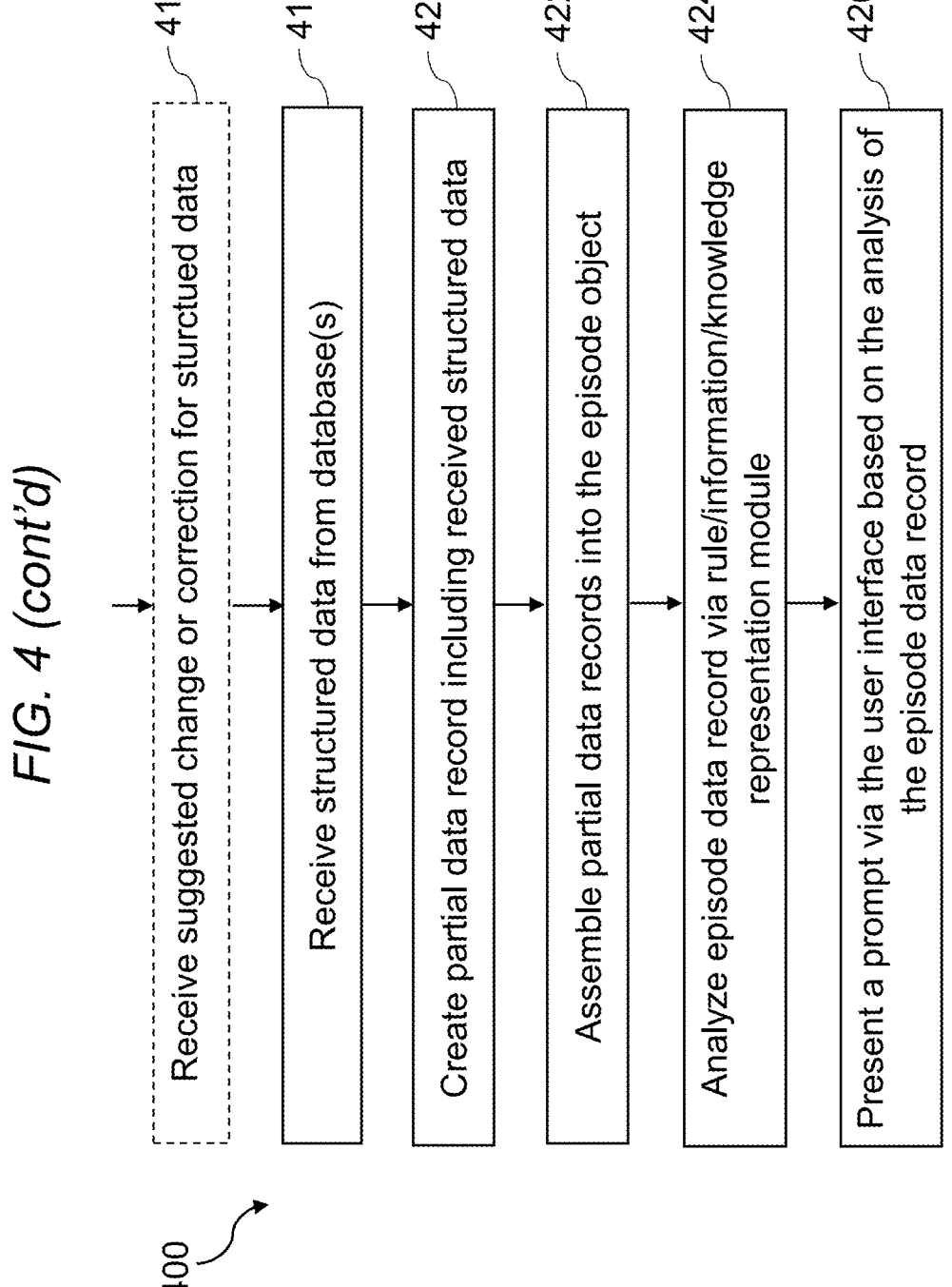

416 — Receive suggested change or correction for sturctued data

418 — Receive structured data from database(s)

420 — Create partial data record including received structured data

422 — Assemble partial data records into the episode object

424 — Analyze episode data record via rule/information/knowledge representation module 426 — Present a prompt via the user interface based on the analysis of the episode data record

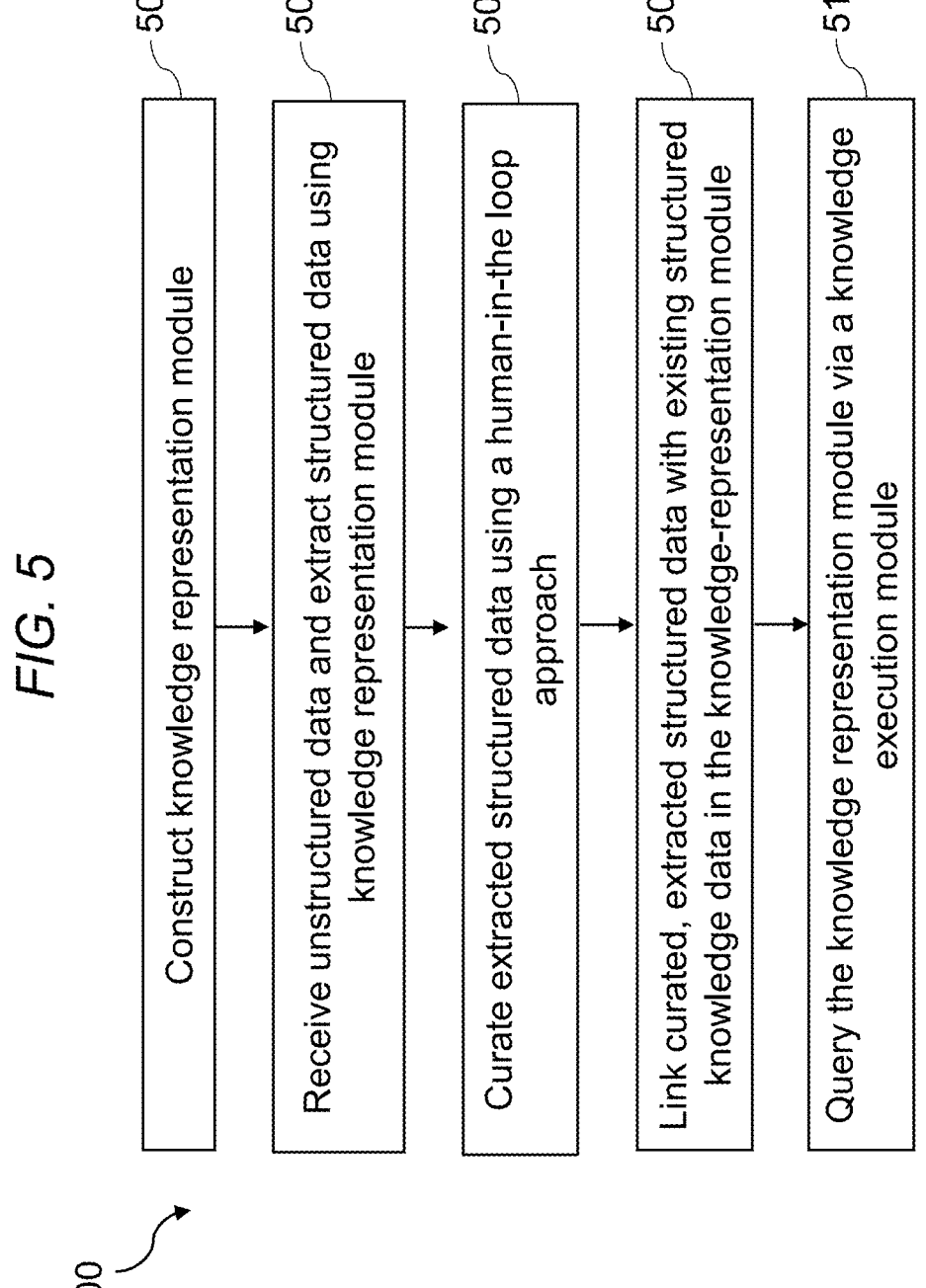

500

502 Construct knowledge representation module

504 Receive unstructured data and extract structured data using knowledge representation module 506 Curate extracted structured data using a human-in-the loop approach 508 Link curated, extracted structured data with existing structured knowledge data in the knowledge-representation module 510 Query the knowledge representation module via a knowledge execution module

Figure 6:
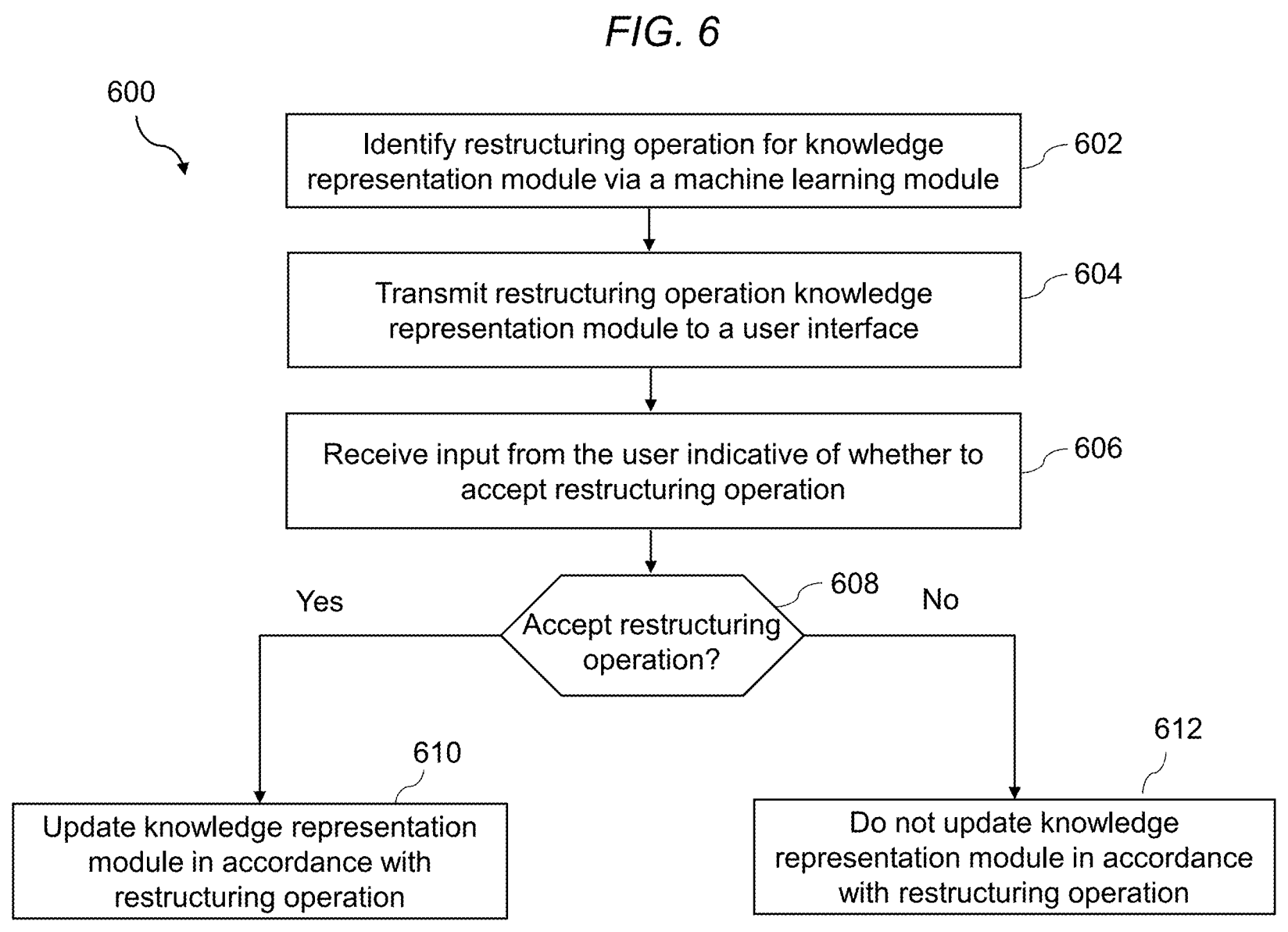

Identify restructuring operation for knowledge representation module via a machine learning module — 602

Transmit restructuring operation knowledge representation module to a user interface — 604

Receive input from the user indicative of whether to accept restructuring operation — 606

Accept restructuring operation? — 608

Yes

Update knowledge representation module in accordance with restructuring operation — 610

No

Do not update knowledge representation module in accordance with restructuring operation — 612

File a Claim

What happened?
Collision

Were there any other vehicles involved?
SingleVehicleCollision (c)

Contact

What is your name?
alice

What is a good phone number for you?
555 123 4567

Is the vehicle driveable?
Yes

*FIG. 10*

SYSTEMS AND METHODS FOR COLLECTING AND PROCESSING DATA FOR INSURANCE-RELATED TASKS

CROSS-REFERENCE TO RELATED APPLICATION(S)

This application claims the benefit of U.S. Provisional Application No. 62/928,814 filed Oct. 31, 2019 and U.S. Provisional Application No. 62/969,446 filed Feb. 3, 2020, which are incorporated herein by reference in their entirety.

TECHNICAL FIELD

This invention relates generally to collecting and processing data to assist in the processing of insurance-related tasks.

BACKGROUND

Insurance companies and their employees are tasked with collecting and processing information in order to complete delivery of their services and meet customers' needs. Insurance companies often have protocols and/or processes in place to guide or assist employees, agents, and/or customers when completing tasks. Training, which can be expensive and time-consuming, is often required to educate employees regarding company protocols and/or processes.

In addition, the enterprise may include call centers that provide services to customers in the form of interactions that attempt to address customers' needs while at the same time carrying out company protocols and processes. Interactions at call centers may be, for example, between a customer and a company representative tasked with gathering and processing information to complete one or more tasks in accordance with company protocols. Deviations from company protocols typically need to be remedied, often at considerable effort and cost, while carrying out complex and multifarious tasks.

BRIEF DESCRIPTION OF THE DRAWINGS

FIG. 4 is a flowchart illustrating a method of operating the data collection and processing system of FIG. 1, in accordance with some embodiments.

FIG. 5 is a flowchart illustrating a method of operating the data collection and processing system of FIG. 1, in accordance with some embodiments.

FIG. 6 is a flowchart illustrating a method of operating the data collection and processing system of FIG. 1, in accordance with some embodiments.

FIG. 7 is a schematic diagram of the rule/information/knowledge representation module of FIG. 1, in accordance with some embodiments.

FIG. 10 illustrates an exemplary system for use in implementing systems, apparatuses, devices, methods, techniques, and the like for collecting and processing data to assist in the processing of insurance-related tasks in accordance with some embodiments.

Figure 1:
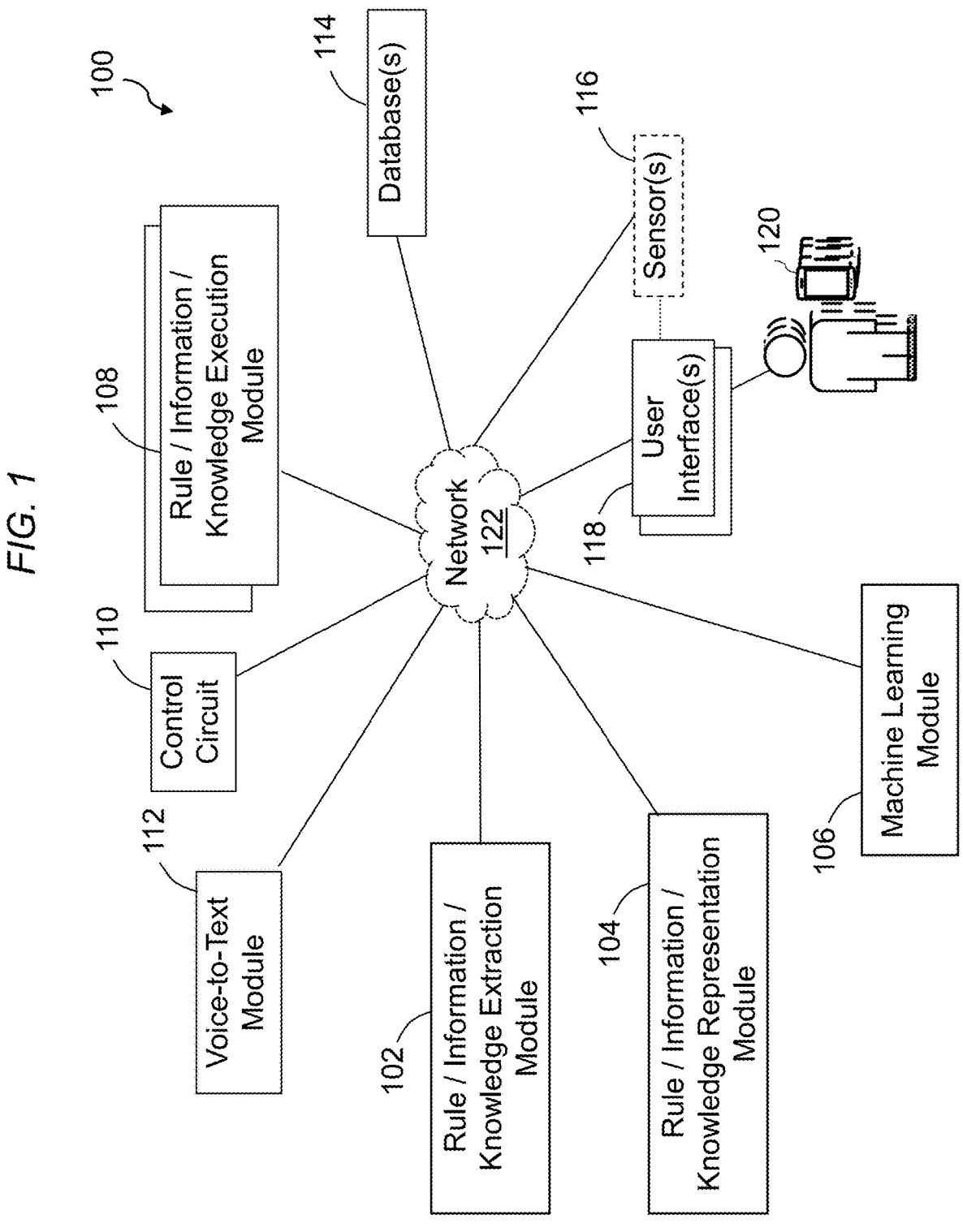
FIG. 1 is a schematic diagram of a data collection and processing system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Provided herein are systems and methods for collecting and processing data to assist in the processing of tasks, for example, insurance-related tasks. The systems and methods described herein may also be useful to guiding a user, such as an insurance company representative, through interactions according to formalized protocols. In some embodiments, systems and methods may be used to collect and process data associated with an episode such as an interaction between a user and a third party. The system may be a data collection and processing system including a knowledge representation module having one or more knowledge graphs and parsing algorithms. The system may receive unstructured text and audio data and parse the unstructured text and audio via parsing algorithms in the knowledge representation module. By one approach, the system assembles parsed, structured data into an episode data record and queries the knowledge representation module to analyze the episode data record. One or more prompts may be generated based on the analysis of the episode data record. In some approaches, the prompts may relate to information or tasks associated with the episode.

Insurance-related tasks may include, for example, processing first notice of loss (FNOL) claims, creating linkages between loss causes and contract clause activation, searching reference manuals, providing real-time assistance to call center representatives or insurance agents, managing customer billing, or creating or modifying insurance policies.

In some embodiments, a method of operating a data collection and processing system includes creating episode data record in an incident database. The system then receives a first unstructured text data input via a user interface, parses the first unstructured text data input to extract a first structured data input via a knowledge representation module comprising a plurality of parsing algorithm, and creates a first partial data record including the first structured data input. In addition to receiving the first unstructured text input, the system receives an audio data input via at least one sensor in communication with the user interface, converts the audio data input to a second unstructured text data input via at least one speech-to-text module in communication with the at least one sensor, parses the second unstructured text data input to extract a second structured data input via the knowledge representation module, and creates a second partial data record including the second structured data input. The system then assembles the first and second partial data records into the episode data record. The system analyzes the assembled episode data record via the knowledge representation module, and presents a prompt via the user interface based on the analyzed episode data record, the prompt including a recommendation regarding data collection for the episode data record.

In some embodiments, a data collection and processing system comprises at least one electronic user device having a user interface, at least one acoustic sensor communicatively coupled to the at least one electronic user device, at least one knowledge representation module including a plurality of parsing algorithms, and a processor in communication with the at least one electronic user device and the at least one knowledge representation module. In the system, the processor is configured to create an episode data record, receive a first unstructured text data input via the user interface, parse the first unstructured text data input to extract a first structured data input via the plurality of parsing algorithms, and create a first partial data record including the first structured data input. In addition, the processor is further configured to receive an audio data input via at least one sensor in communication with the user interface, convert the audio data input to a second unstructured text data input via at least one speech-to-text module in communication with the at least one sensor, parse the second unstructured text data input to extract a second structured data input via the knowledge representation module, create a second partial data record including the second structured data input. The processor then assembles the first and second partial data records into the episode data record, analyzes the assembled episode data record via the knowledge representation module, and presents a prompt via the user interface based on the analyzed episode data record, the prompt including a recommendation regarding data collection for the episode data record.

In other embodiments, a method of operating a data collection and processing system according to a protocol wherein the system receives a first audio input via an electronic user device, the first audio input including a first question, and receives a second audio input via the electronic user device, where the second audio input including an answer to the first question. The system then analyzes the first and second audio inputs via a knowledge representation module comprising a plurality of parsing algorithms representing the protocol and populates at least one field in a data collection record based on the analysis of the first and second inputs. The system then generates a prompt based on the analysis of the first and second audio inputs, the prompt including a second question, and displays the prompt via user interface of the electronic user device.

It is contemplated that the data collection and processing systems described herein may provide quicker or more efficient processing or collection of data. It is also contemplated that the combined human and machine learning interaction using the knowledge representation module may provide an interaction that is more natural than a completely machine directed interaction while also providing a more effective or efficient interaction. The system may also steer an interaction more quickly to relevant information more quickly by processing the interactions between employees or representatives and third parties. In addition, the systems and methods described herein may also improve the accuracy of data collection, require less training for employees or representatives involved in the collection or processing of data, or reduce the cognitive load of employees or representatives so they may engage more naturally in conversation and other interactions. Having a knowledge representation module, as described herein, also may permit system updates to be more quickly incorporated therein by having a central knowledge graph updated once such that the updated are propagated through to multiple modules or APIs that plug into or otherwise interface with the knowledge graph, as opposed to incorporating the change into each module or API.

Turning to the figures, FIG. 1 includes a schematic diagram of a data collection and processing system 100 in accordance with some embodiments. The system 100 may be used to assist in the processing of one or more insurance-related tasks.

The system 100 includes at least one sensor 116, electronic user device 120 including a user interface 118, and database 114. Data may be input into the system 100 via the sensor(s) 116, electronic user device(s) 120, and/or database (s) 114.

The sensors 116 may include acoustic sensors (e.g., for collecting speech input, image sensors, temperature sensors, proximity sensors (e.g., for detecting the presence or absence of a nearby object), pressure sensors, gas sensors, smoke sensors, accelerometer sensors, optical sensors, humidity sensors, and/or motion detection sensors, among others. In some embodiments, the sensor(s) 116 may be incorporated into the electronic user device 116. For example, the electronic user device 116 may be a personal computer having an audio sensor such as a microphone for receiving speech input. A voice-to-text module 112 may be in communication with one or more sensors 114. The sensors 116 may be configured to collect and transmit data with various system modules (e.g., the rule/information/ knowledge extraction module 102, representation module 104, or execution module 108). The sensors 116 may also be configured to transmit data to one or more electronic user devices 120. For example, data collected via one or more sensors 116 may be displayed via the user interface 118 of an electronic user device 120. In some approaches, when the sensor 116 is an audio sensor configured to collect speech input, data collected via the acoustic sensor may be processed for example via a speech-to-text module 112 to convert audio data to text before it is displayed via a user interface 118.

The electronic user device(s) 120 may include, for example, tablets, smart phones, laptops, personal computers, smart watches, and any other suitable electronic device. One or more user interfaces 118 may be associated with an electronic user device 120. The user interfaces 1180 may be configured to receive and display notifications, alerts, reports, instructions, or other data generated by the system 100. In some approaches, the voice over internet protocol (VoIP device).

The database(s) 114 may be any suitable database housing structured data. In some embodiments, the database(s) 114 may provide information and/or data relevant to one or more tasks, for example, to insurance-related tasks. Databases that may provide information useful to insurance-related tasks may include. For example, the database(s) 114 may house insurance policy data, electronic correspondence data, insurance rate data, glossary data, business rules data. Such databases may include rules, information, and/or knowledge relating to insured parties (e.g., contact information), insurance policies, types of insurances claims, insurance rates, insured assets, events or incidents, business processes, and/ or tasks. One or more database(s) 114 may be housed within one or more business applications.

The system 100 also includes various modules to facilitate the collection and processing of data. Modules in the system 100 include at least one of a rule/information/knowledge extraction module 102 (hereinafter referred to as the "knowledge extraction module"), a rule/information/knowledge representation module 104 (hereinafter referred to as the "knowledge representation module"), and a rule/information/knowledge execution module 108 (hereinafter referred to as the "knowledge execution module"). The various modules may be in communication with or otherwise configured to receive data from the sensor(s) 116, electronic user device(s) 120, and/or database(s) 114.

The knowledge extraction module 102 may receive rules, information, and/or knowledge from one or more sources. Suitable sources include, for example, database(s) 114, sensors 116, and/or include user devices 120. The knowledge extraction module 102 may receive input in the form of either structured or unstructured data. Unstructured data, for example, may be in the form of documents or audio data such as voice streams received by one or more sensors. In some forms, knowledge extraction module 102 may include or be in communication with the voice-to-text module 112 such that incoming voice streams may be converted from unstructured to structured text data.

The knowledge representation module 104 includes an agnostic representation of rules, information, and/or knowledge. The representation is agnostic in that it allows rules, information, and/or knowledge from any number of heterogenous systems to interact. In some forms, the knowledge representation module may store rules, information, and/or knowledge in a declarative fashion. The knowledge representation module 104 may include a knowledge-graph. The knowledge-graph may comprise a graph-structured data model including entities, entity properties, and relationships therebetween. The knowledge-graph may structure entities (such as people, places, objects, etc.) as nodes and relationships between entities as edges. Nodes may include one or more data fields. Certain nodes may be "types" and certain nodes may be "instances". A type node may provide a representation of data field types associated with the node, and an instance node may provide a representation of populated data fields associated the node. For example, a "type" node associated with Contact information may comprise two data fields—name and phone number. The "instance" node associated with Contact Information may include two populated data fields—name_John Doe and phone_number_555-5555.

Nodes in the knowledge-graph form a schema, or a description of a complex type. Two entities connected by a relationship may, for example, form a fact. For example, one entity may represent "Claim" information and one may represent "Contact" information, the relationship between the Claim and Contact entities may be the insured party (see FIG. 7). Entities in the knowledge-graph may include objects, locations, products, people such as insurance policy holders, vehicles, assets, or anything with which data may be associated. The knowledge representation module 104 may also include a plurality of parsing algorithms to parse unstructured data. Machine learning may be used to parse unstructured data. Machine learning may also be used to link data received by the knowledge extraction module 102 to structured data in the knowledge representation module 104.

The knowledge representation module 104 may also store one or more prompts, which may, for example, take the form of questions, recommendations, or instructions. In some forms, prompts may be attached to or associated with nodes within a knowledge graph. One or more prompts may be attached to or associated with a data field within a node. For example, the prompt "What is your phone number?" may be attached to a "Phone Number" filed of a "Contact" node. The system may generate or retrieve such prompts, for example, by querying the knowledge graph.

The knowledge execution module 108 may be configured to query or otherwise access rules, information, and/or knowledge in the knowledge representation module 104. The knowledge execution module 108 may include one or more application programming interfaces (APIs) including application-specific logic. The APIs may facilitate the processing and/or execution of one or more insurance-related tasks. In one example an API may facilitate the processing of a first notice of loss to file an insurance claim. Machine learning may be used in the knowledge execution module 108. For example, machine learning may be used to facilitate information retrieval from the knowledge representation module 104. In addition, machine learning may be used to generate prompts based in part on relationships in the knowledge representation module 104.

The system may also include one or more machine learning modules 106. The machine learning module(s) 106 may be independent of or included as part of the knowledge extraction module 102, representation module 104, or execution module 108. The machine learning module 106 may be configured to execute one or more machine learning algorithms.

As illustrated in FIG. 1, the various components of the data collection and processing system may communicate directly or indirectly, such as over one or more distributed communication networks, such as network 150. For example, network 150 may include LAN, WAN, Internet, cellular, Wi-Fi, and other such communication networks or combinations of two or more such networks.

The system includes 100 a control circuit 110 in communication with system components. The system includes 100 a control circuit 110 in communication with one or more databases, electronic user devices, sensors, and modules of FIG. 1. The term control circuit refers broadly to any microcontroller, computer, or processor-based device with processor, memory, and programmable input/output peripherals, which is generally designed to govern the operation of other components and devices. It is further understood to include common accompanying accessory devices, including one or more memories transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

Figure 2A:
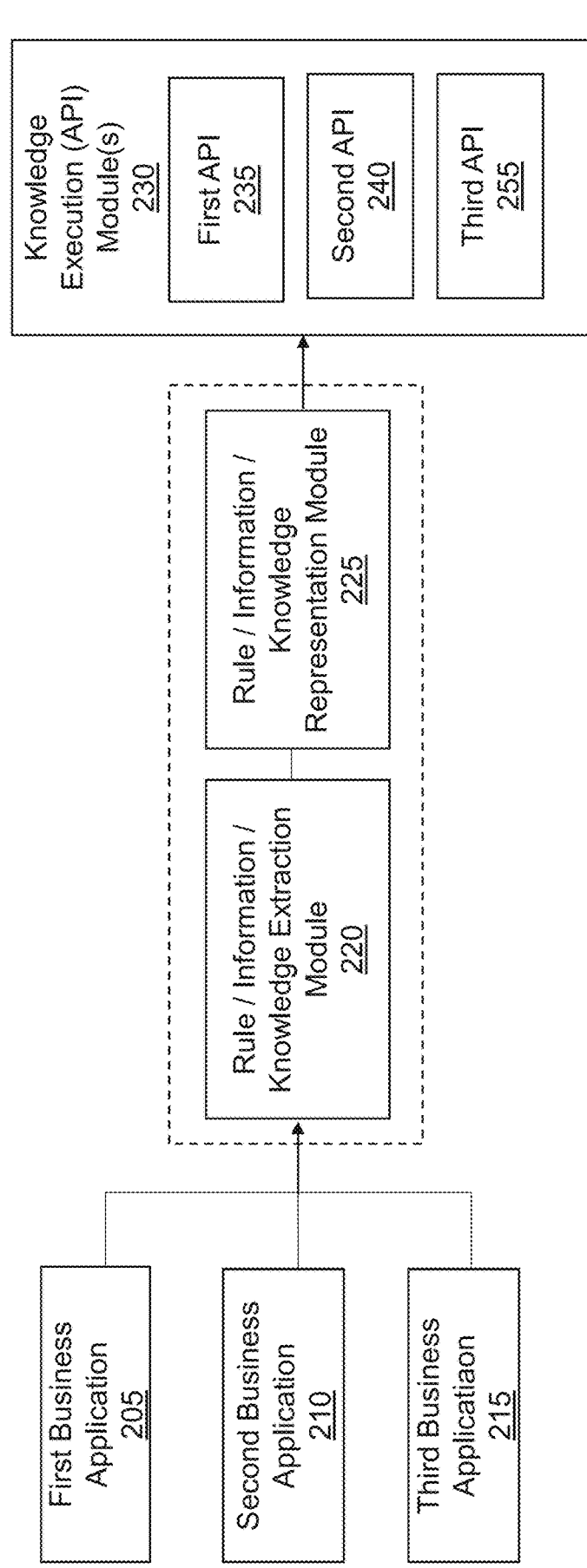
FIGS. 2A and 2B include schematic diagrams of modules in the data collection and processing system of FIG. 1.
Figure 2B:
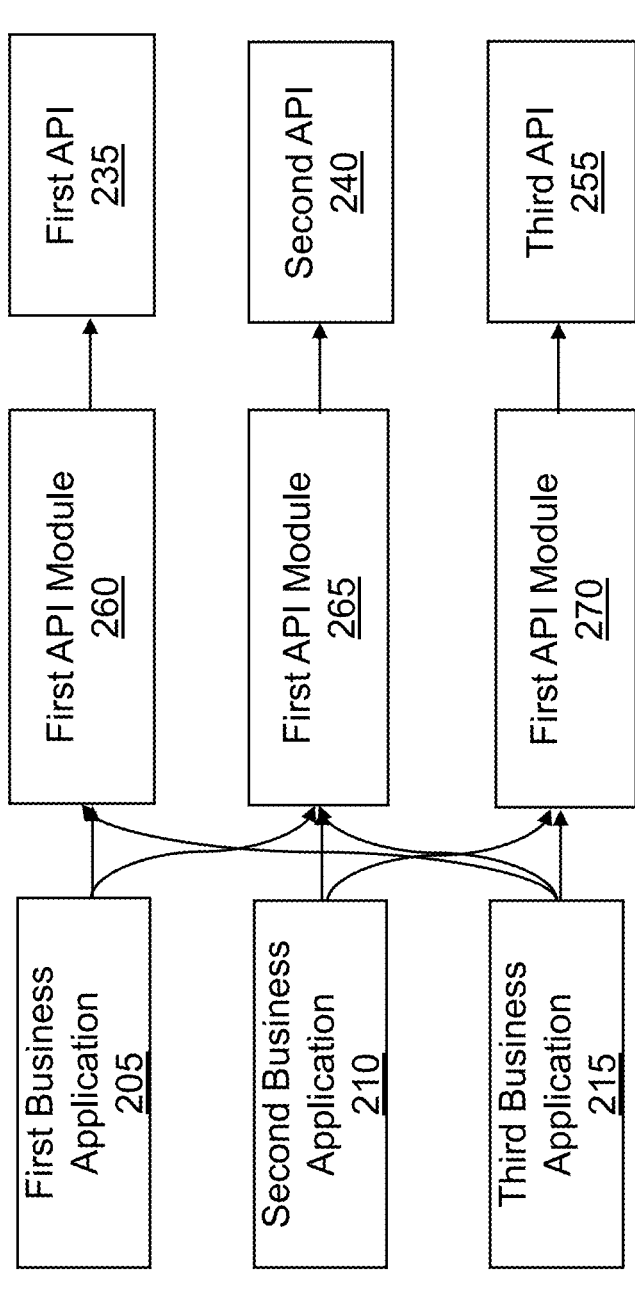

FIGS. 2A and 2B are schematic illustrations of exemplary architectures for modules in the data collection and processing system of FIG. 1. More specifically, FIG. 2A illustrates a system with a knowledge extraction and knowledge representation module interfacing with various business applications and various APIs. FIG. 2B illustrates a system without a knowledge extraction or a knowledge representation module. Business applications may include one or more databases in addition to rules and/or logic associated with the application.

In the first exemplary architecture of FIG. 2A, the knowledge extraction module 104 is in communication with a first 205, second 210, and third 215 business application. The knowledge extraction module 220 receives rules, information, and knowledge from each business application or from databases housed within the business application. The rules, information, and knowledge are represented in the knowledge representation module 225 as described with reference to FIG. 1. The knowledge execution module 230 interfaces with the knowledge representation module 225, allowing the knowledge execution module to query the knowledge representation module and access rules, information, and/or knowledge from a number of different business applications. The knowledge execution module 230 includes a first 235, second 240, and third 255 API. The architecture of FIG. 2A may enable application developers to build applications that otherwise may be prohibitively complicated by providing consolidated access to rules, information, and knowledge and by allowing changes in one business application to be propagated through to all three applications via the knowledge representation module.

In the second exemplary architecture of FIG. 2B, the system lacks a knowledge extraction module 220 and a knowledge representation module 225. Instead, in FIG. 2B, each application includes a separate dedicated application module with logic to drive the respective application. The first API module 260 includes logic and rules, information, and knowledge for the first API 235, the second API module 265 for the second API 240, and the third API module 270 for the third API 255. Each application module must interface with each business application 205, 210, 215 to extract data from the business application. Further if rules, knowledge, and/or information is changed in a business application, that change would have to be propagated through each API module. By contrast, a change to rules, knowledge, or information in a business application in FIG. 2A would only have to be propagated into a single knowledge representation module, which drives multiple unrelated APIs.

Figure 3:
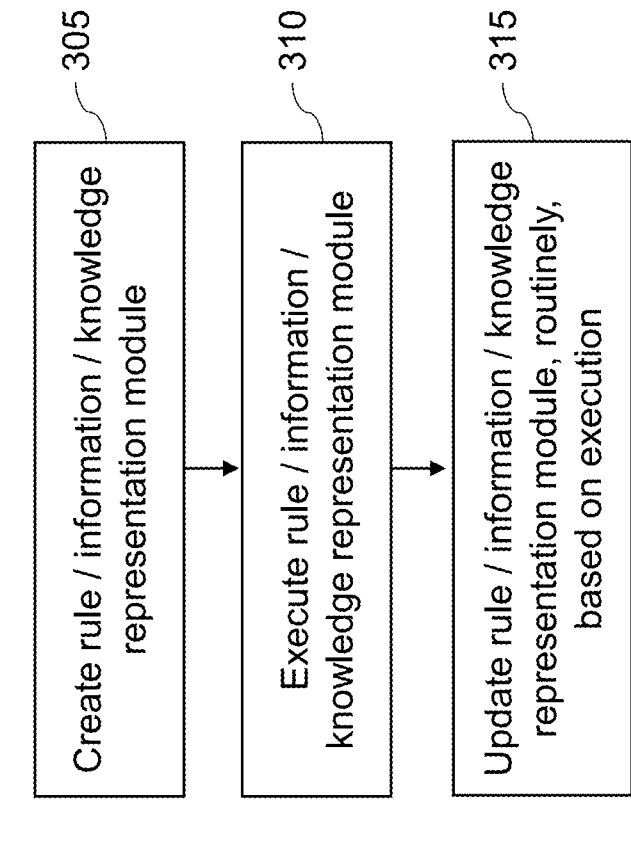
FIG. 3 is a flowchart illustrating a method of operating the data collection and processing system of FIG. 1, in accordance with some embodiments.

FIG. 3 illustrates one method 300 of operating the data collection and processing system 100 of FIG. 1. The method 300 includes creating 305 a knowledge representation module. Creating the knowledge representation module includes constructing a knowledge-graph. The knowledge-graph may be constructed manually, automatically by extracting information from structured and semi-structured text, or by some combination thereof. Next, the system executes 310 the knowledge representation module. Executing 310 rules, knowledge, and/or information the knowledge execution module may involve providing one or more APIs that access and query the knowledge representation module or knowledge-graphs housed within the knowledge representation module. The system may then update 315 the knowledge representation module, routinely, based on execution. In some approaches, the system may use machine learning, human-in-the-loop curation, or some combination thereof to update the knowledge representation module.

FIG. 4 illustrates a method 400 of operating the data collection and processing system 100 of FIG. 1 according to some embodiments. The method 400 may be part of an API that accesses the knowledge representation module.

The data collection and processing system 100 executes method 400 to capture a data record summarizing or otherwise relating to representing a particular episode, that is, any interaction, incident, or event. Such a data record collected by the data collection and processing system 100 is referred to as an episode data record. The episode, for example, may be an interaction between, one or more users, between a user and a third party, or between a user and an electronic user device. The episode may also be an interaction between an insurance provider employee and an insured party or some third party. The episode may relate to a request for information, reference manual searching, a billing process, a protocol or process, a task, creation or modification of an insurance policy, insurance policy searching, an initial report to an insurance provider following loss, theft, or damage of an insured asset, or to any other insurance-related interaction, incident, or event.

By executing method 400, the data collection and processing system 100 also may guide a user through one or more protocols, processes, or workflows to accomplish a particular task. For example, the method 400 may guide a user through one or more an insurance company protocols or assist a user in the processing of an insurance-related task. In one particular example, the method 400 may be used to assist an insurance company representative in processing a first notice of loss, filing an insurance claim. The method 400 may also be used to guide an insurance company representative through an interaction with an insured party.

In method 400, the system may first initiate 402 a protocol, process, or workflow associated with an episode. The system may initiate a protocol, process, or workflow associated with the episode based at least in part on an interaction between a user and a third party or based on an interaction between a user and an electronic user device. To initiate the protocol, process, or workflow, the system may receive data relating the interaction, for example, from a sensor or via a user interface associated with an electronic user device. For example, in the interaction a user makes a selection on a user interface to initiate a protocol relevant to the episode. In another example, a user may type free form text into a user interface or may speak into a sensor associated with an electronic user device to provide a voice stream that is converted to unstructured or free form text. The system may then converts unstructured data to structured data. The system may identify and initiate a protocol, process, or workflow associated with the episode based on the structured data received in this manner.

The system may then create 404 an episode data record corresponding with the episode. The episode data record may store one or more facts or pieces of information relating to the episode. As discussed below, as the episode progresses, the system will assemble facts and information into the episode data object in accordance with one or more protocols housed in the knowledge representation module. The system may parse unstructured data to form "parse trees" via the knowledge representation module or knowledge graph(s) housed therein. At the beginning of an episode, the episode data record may be "empty" or have no information stored therein. The episode data record may be populated with information over the course of the episode. In some approaches, the episode data record may correspond with a parse tree. A partial episode data record may correspond to an incomplete parse tree while a complete episode data record may correspond with a complete parse tree.

In one example, when the episode is an interaction between a representative and an insured party relating to a first notice of loss, the episode data record may be a claim record associated with the first notice of loss. In this example, the claim record may include information pertaining to the insurance claim such as the asset involved, the condition of the asset, the insured party, any third parties involved, and any other information relevant to or useful for the processing of an insurance claim by an insurance provider.

Once the episode data record is created, the system receives 406 unstructured text data from an electronic user device. For example, unstructured text data may be input by a user via a user interface. The unstructured text data may be free text typed into a user interface, a webpage, a document corpus, a diagram, a written communication, records such as health or billing records, or any other suitable unstructured data form. In one example, the unstructured may be notes typed into a user interface or documents uploaded by a user such as in insurance provider representative or employee.

The system may also receive 408 audio data via one or more sensors. The audio data may be a voice stream, speech, or any other suitable audio data form. After the system receives audio data, it converts 410 the audio data to unstructured text data via a voice-to-text module.

In some embodiments, in addition to receiving unstructured text data and audio data, the system may receive other unstructured data such visual data such as images or video data via one or more electronic devices or sensors. It is contemplated that unstructured data may include raw input received from any sensor. For example, the system may receive an image of a driver's license from a camera. The system may then run optical character recognition (OCR) on the driver's license image to obtain text data.

The system then parses 412 unstructured text data to extract structured data. One or more parsing algorithms may be stored in the knowledge representation module or a knowledge graph housed in the knowledge representation module. The parsing algorithm may convert unstructured data to structured data or otherwise induce structure into data. It should be understood that unstructured data could include data with some degree of structure, and that unstructured data may include data that is semi-structured. Similarly, structured data may include data into which structure has been introduced, for example, by a parsing operation. In some approaches, the system parses unstructured data using a plurality of parsing algorithms included in the knowledge representation module. The machine learning module may use one or more machine learning algorithms to assist with parsing. For example, machine learning may be used to identify entities in unstructured data or to automatically identify relationships between entities. Further, machine learning may be used to induce grammar and schemas from unstructured data, for example from a document corpus.

In one exemplary parsing algorithm may receive unstructured data in the form of the free text statement: "My name is John Doe and my phone number is 555-5555." The parsing algorithm may then introduce the data structure: first name field: "John"; last_name field: "Doe"; phone_number: "555-5555". In another exemplary parsing algorithm, the system may receive unstructured text data in the form of the free text statement: "I got rear ended." The parsing algorithm may create a type node of "Multi-Vehicle Collision", The system creates 414 one or more partial data records including the extracted structured data. In some approaches, the system may not create a separate partial data record but may include the extracted structured data in the episode data record. The structured data may also be displayed on a user interface.

In some embodiments, the structured data may also be displayed un a user-editable field on a user interface such that a user can correct, approve or disapprove, or otherwise suggest changes in the structured data, for example, to correct mistakes in parsing. The system receives 416 the change or correction in the structured data from the user interface. If a correction is made or a change is suggested, the system may also update the structured data stored in the partial data record or episode data record to reflect the correction or suggested change. For example, if the unstructured text data received was "I crashed my car" and the system parsed this as "Weather", the user could change "Weather" to "Collision" in the partial data record via the user interface.

It is also contemplated that the system may store the change or correction made to the structured data. The change or correction may be stored and used as a training data set for the machine learning module. The machine learning module may then perform machine learning using at least one machine learning algorithm and the training data set in order to identify a change to the knowledge representation module. For example, the machine learning module may identify a change to a parsing algorithm or any suitable change to a knowledge graph housed in the knowledge representation module. Once the change to the knowledge representation module is identified, the system may then update at a parsing algorithm or other change to the knowledge graph. Such an operation may occur in real-time, that is, as soon as the training data set is updated, the machine learning algorithm is automatically retrained and future parses made by the updated machine learning algorithm.

In addition to receiving unstructured data, the system may also receive 418 structured data from one or more databases. The structured data may be one or more taxonomies, controlled vocabularies, data models (i.e., schemas), business rules, business processes, or any other suitable structured data form. In one example, when the episode relates to a FNOL associated with an insurance claim, the structured data may be an insurance policy holder's address and phone number which may be obtained from a customer database. After the system receives structured data, it creates 420 one or more partial data records including the received structured data. It is contemplated that by including a combination of structured and unstructured data may provide flexibility, for example, by making an interaction more flexible or efficient. Structured data may be used to supplement the collection of unstructured data over the course of an interaction. For example, in filling out a contact information field for an episode data record, the system may query a database to access structured data such as an address or phone number associated with an individual rather than having to prompt the individual to provide information on his or her phone number and address. Accordingly, to the extent structured data exists, for example in a database, the system may leverage that existing data to improve the efficiency of an interaction.

The system assembles 422 partial data records into the episode data record or, in some approaches, into another partial data record. The system may assemble partial data records into the partial or episode data record at any point in time after the partial data record has been created. Assembly may update the episode data record with information from one or more partial data records. Assembly may also combine two or more partial data records into one cohesive record. In some examples, assembly entails saving data from one or more data records in an episode record or into another partial data record. In one example, a first partial data record includes: a first_name field populated with "John"; a last-_name field that is empty or null; and a phone_number field populated with "555-5555". In this example, a second partial data record includes: a first_name field that is empty or null; a last_name field populated with "Doe"; and a phone number field that is empty or null. The system may assemble the first and second partial data records into one cohesive episode data record including: a first_name field populated with "John"; a last_name field populated with "Doe"; and a phone_number field populated with "555-5555".

Once one or more partial data records have been assembled into the episode data record, the system analyzes 424 the episode data record via the knowledge representation module. The system may analyze the episode data record by querying the knowledge representation module or by querying a knowledge graph housed in the knowledge representation module. In some approaches, the system may query the knowledge graph to determine whether an episode data object or parse tree is complete. The system may query the knowledge graph to determine one or more pieces of information missing from the episode data record. In some approaches, a knowledge graph in the knowledge representation module includes a representation of the schema of what a complete episode data record should look like and compares the partial data record(s) to the schema to identify one or more pieces of missing information. If more than one piece of information is missing, the system may also analysis may also include determining an particular order in which missing pieces of information should be acquired according to a specified order of preference or in order to achieve a goal or objective. Such a goal may be, for example, to minimize the duration of an interaction (i.e., episode) between a user and a third party. The goal or objective may also be to minimize the number of questions, prompts, or requests for information required to obtain missing information. In some approaches, the goal or objective could also to maximize selling or recommendation possibilities. The system may analyze information collected over the course of an episode for potential selling opportunities or recommendations. For example, the system may identify that a customer states that their family has expanded while updating their automobile policy in light of a recent purchase of a minivan and may send a prompt "We see that your family has expanded. Would you be interested in purchasing life insurance." In another example, the system may see that a teenager has been added to an insurance policy and the system may send the prompt "We see you have a new driver. Would you like to purchase roadside assistance?"

The system then may present 426 one or more prompts to a user based on the analysis of the episode data record. The prompts may be presented to a user via one or more user interfaces. Prompts may be either auditory or visual. Prompts may include one or more questions, instructions, requests for information, or any recommendation regarding data collection for the episode data record. The prompts may relate to data that is missing from or required to complete the episode object. In some approaches, a question or requests for information may be associated with a portion of the knowledge graph so that, upon querying the knowledge graph to determine data missing from an episode object, the system may send the question or request for information to a user in order to complete the episode object. The prompts may request a user to input structured or unstructured data into the system, for example, via an electronic device or user interface. Prompts may also be in the form a report, communication, or message related to the episode. In some approaches, the prompt may include one or more of plain text, rich text, a discrete selector, a button, a check-box, a constrained value, an image, an audio message, or a video. The prompt may also request a user to make a discrete selection via the user interface—such a selection may relate to data that is missing from the episode data record. It is also contemplated that, in addition to sending prompts, the system may send one or more signals to actuate a device.

In some approaches, the system will continue to receive unstructured and structured data and create partial data records therefrom until a complete episode data record exists. A data record may be considered to be complete, for example, when a predetermined set of data has been obtained for the episode data record (e.g., when particular fields within the episode data record have been populated). Whether an episode data record is complete may depend, for example, on the demands of a database or business application that is receiving the episode data record. For example, when the system is being used to process a FNOL, a complete data record may include those pieces information necessary for the claims processing system that will receive the episode data record relating to the claim initiated from the FNOL. In some approaches, an episode data record may be complete when a parse tree has been completed. In some approaches, the system will continue to receive unstructured and structured data until the episode, for example, an interaction is ended. In other approaches, the system will continue to receive unstructured and structured data until a specified number of partial data records have been obtained for the episode data record. An episode data record or partial data record may be stored, for example, in a database or even in a knowledge graph or other portion of the knowledge representation module. In one example, a parse tree may reflect all information required to initiate an insurance claim after a first notice of loss.

In some examples, the episode may relate to a FNOL for an insurance claim. The episode, for example, may be an interaction such as a phone call between an insurance company representative and an insured party or customer. The method 400 may be used to acquire information from the insured party to create a claim and to guide the insurance company representative through the claims filing process. In some examples, when the episode relates to a FNOL for an insurance claim, the method 400 may be used to collect and process information relating to insurance claim such as insured party information (e.g., contact information), claim type (e.g., collision, hail damage, windshield damage), and other information about the incident and the condition of the insured asset (e.g., whether a vehicle is drivable, whether airbags deployed, whether there are injuries).

FIG. 5 illustrates a method 500 of operating the data collection and processing system of FIG. 1, in accordance with some embodiments. Method 500 is an exemplary method of constructing and periodically updating the knowledge representation module of FIG. 1. In method 500, they system may ingest knowledge, rules, or information from one or more external sources (i.e., external to the system).

Method 500 may begin by constructing 502 a knowledge information module. As discussed above, constructing the knowledge representation module may include constructing a knowledge graph. To construct the knowledge-graph, rules, information, and knowledge may be extracted from a number of sources, such as business applications, sensors, a website, or via a user interface. In some approaches, the knowledge graph may be constructed manually, wherein entities and relationships therebetween are manually established to create a graph-based data representation. In some embodiments, the knowledge graph may include one or more protocols or processes used by an insurance provider.

Next, the system may receive 504 unstructured data in such forms as unstructured text or audio data. The knowledge representation module may then be used to extract structured data, for example, via parsing algorithms in the knowledge representation module. For example, structured data may be parsed by the knowledge representation module to identify entities in unstructured data and key relations between entities. In some approaches, the system may receive unstructured data in the same manner as is described with reference to step 406 in FIG. 4.

The system may then curate 506 extracted structured data using a human-in-the loop approach. In some approaches, curation 506 may occur as described with reference to step 426 in FIG. 4 where a representative confirms data entered into an episode data record by the system. One suitable human-in-the-loop curation process is described with reference to FIG. 6. The parsed structured data may also optionally be linked 508 to existing knowledge in the knowledge representation module. In some approaches, linking 508 may occur as described with reference to step 412 in FIG. 4 where unstructured text inputs are parsed. One or more machine learning algorithms may be used to link extracted structured data to existing structured data in knowledge representation module or knowledge graph. Machine learning may also be used to link incoming unstructured text data such as a document to part of a taxonomy in the knowledge representation module. After the knowledge representation module has been updated, the system may then query 510 the updated knowledge representation module via the knowledge execution module. In this manner, changes to the knowledge representation module may be accessed via one or more APIs that are included as part of the knowledge execution module. In one example, an API may query the updated knowledge representation module as described in the method of FIG. 4.

FIG. 6 illustrates a method 600 of operating the data collection and processing system of FIG. 1, in accordance with some embodiments. The method 600 of FIG. 6 relates to a human-in-the-loop-curation process that may be used to update the knowledge representation module. In one approach, the method 600 may be used to update a knowledge graph included in the knowledge representation module. The method 600 may be used to identify one or more restructuring operations or changes for a knowledge graph and incorporated such changes or restructuring operations into the knowledge graph. In some approaches, the method 600 may be used in conjunction with the method of FIG. 5.

In method 600, the system identifies 602 one or more restructuring operations for the knowledge representation module. The system may identify restructuring operation via a machine learning module. For example, machine learning algorithms may be used to refine taxonomies and hierarchies in the knowledge representation module. The method 600 may be used to identify one or more restructuring operations or changes for a knowledge graph included in the knowledge representation module. Such a restructuring operation may change the structure of the knowledge graph (i.e., change how rules, knowledge, or information are represented in the knowledge graph). Restructuring may involve refining one or more schemas, taxonomies, or node or type hierarchies in the knowledge graph.

Changing the node hierarchy may involve merging two nodes or types together, reassigning a node or type, or splitting a node or type into one or more subtypes. As part of a merge operation, you can add properties to the node or types to distinguish them. For example, if a node or type is "Vehicle", one restructuring operation may by to add the property "number of wheels". In another example, a split operation may include dividing a "Vehicle" node which includes "Jet Ski", "Yacht", "Car" and "Motorcycle" to include "Watercraft" and "Auto". Thus, after restructuring, the "Vehicle" node could be related to "Watercraft" and "Auto" nodes and the "Watercraft" would be related to "Jet Ski" and "Yacht", while "Auto" would be related to "Car" and "Motorcycle".

In one example, the restructuring operation may restructure a node related to insurance claim types. The node may include three claim nodes: flood related, hail related, and collision related. A machine learning algorithm may determine which claim node is associated with claim description provided via unstructured text. When multiple errors occur in determining claim type based on the description and the system confuses flood and hail because they are both weather related, the system may propose a restructuring operation that combines flood and hail into a "Weather" node and associates the node with a prompt including the question "Was it flood or hail?"

Next, the system transmits 604 the identified restructuring operation(s) to one or more user interfaces. In this manner the identified restructuring operation(s) may be presented to a user so that a user may "curate" the knowledge graph restructuring operation. Curation may refer to selecting, organizing, or otherwise providing input, for example, regarding a change or restructuring operation for the knowledge graph. In one approach, the user interface may display the restructuring operation on the user interface along with an associated prompt. The prompt may include, for example, a discrete selector, button, check-box, or editable field that allows a user to indicate whether to accept the restructuring operation.

In response to transmitting the restructuring operation to a user interface, the system receives 606 input indicative of whether to accept the restructuring operation 608 from one or more users. The system may receive input, for example, via the user interface. When the input indicates that the user accepts 610 the restructuring operation, the system updates the knowledge representation module, or a knowledge graph included in the knowledge representation module, in accordance with the proposed restructuring operation. When the input indicates that the user does not accept the restructuring operation, the system does not update 612 the knowledge representation module, or a knowledge graph included in the knowledge representation module, in accordance with the proposed restructuring operation.

Figure 7:
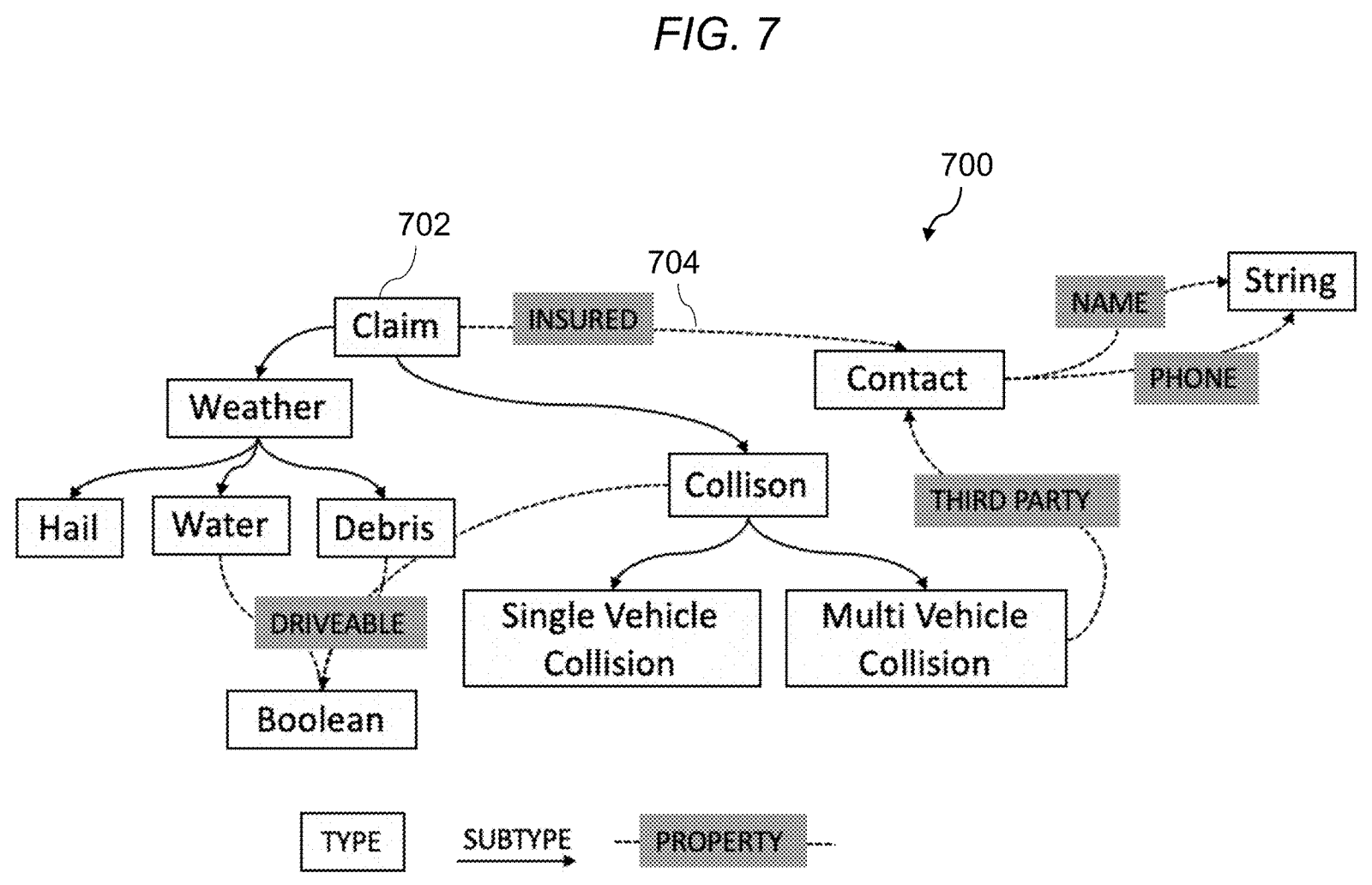

FIG. 7 is a schematic diagram of an exemplary portion of the knowledge representation module of FIG. 1, in accordance with some embodiments. The knowledge representation module 700 illustrated in FIG. 7 is in the form a knowledge graph. The knowledge graph in FIG. 7 includes an insurance provider's institutional rules, information, and knowledge pertaining to initiating an insurance claim for a first notice of loss. The knowledge graph includes a plurality of entities 702 and relationships 704 between those entities. In the knowledge graph multiple entities 702 and relationships therebetween comprise a schema. The knowledge representation module 700 may be queried by an API of the knowledge execution module.

Figures 8A, 8B, 8C, 8D:
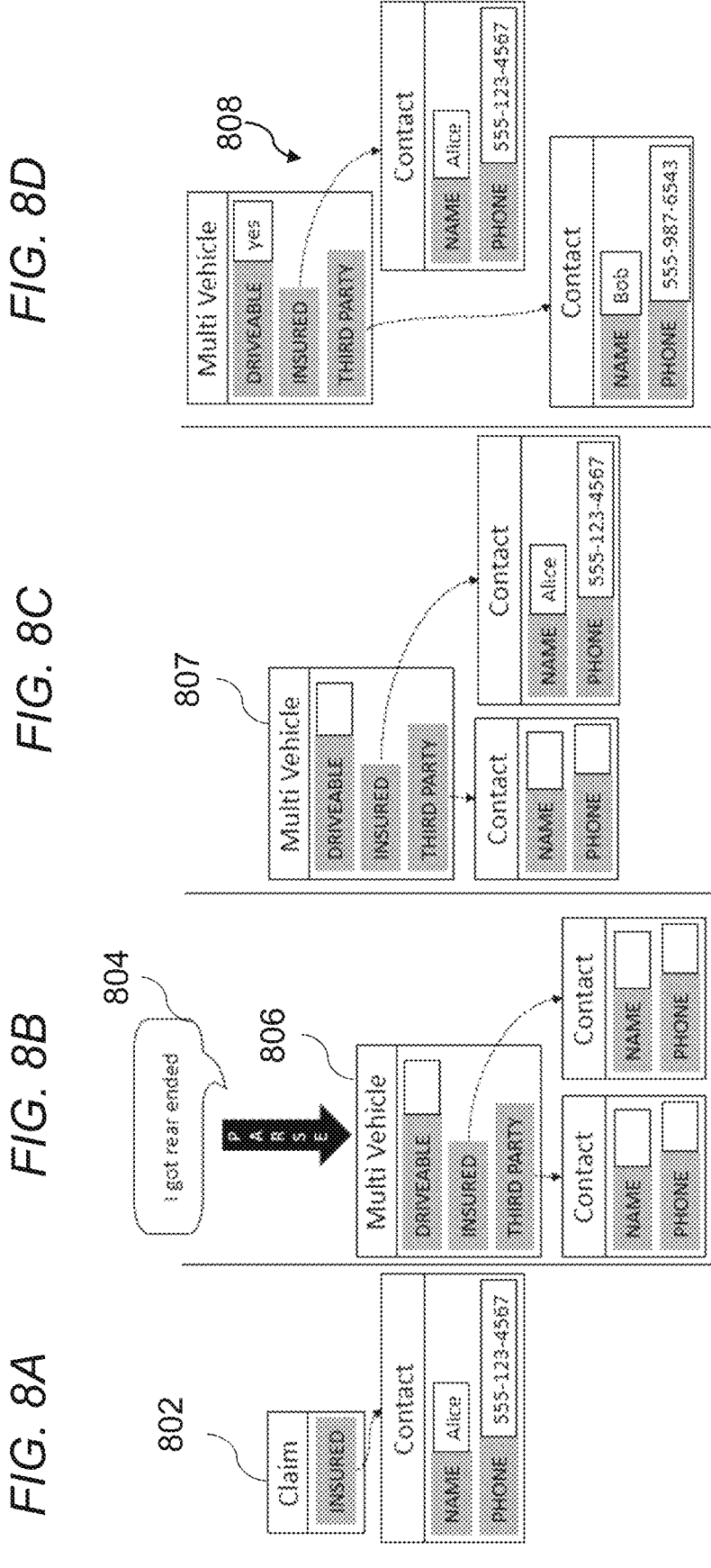
FIGS. 8A, 8B, 8C, and 8D are schematic diagrams of exemplary partial data records and an exemplary episode data record in accordance with some embodiments.

FIGS. 8A, 8B, and 8C present an exemplary progression of partial data records over the course of an episode. FIG. 8D presents an example of a complete episode data record 800 in accordance with some embodiments. The exemplary episode relates to a first notice of loss received by a representative via a call center. FIG. 8A illustrates a first partial data record 802 that was created by the system at the beginning of the episode. The first partial data record 802 includes information relating to the claim type and contact information for the insured party. FIG. 8B illustrates unstructured text input 804 that is received by the system and parsed using the knowledge representation module. After the unstructured text input 804 is parsed, the system creates a second partial data record 806 including the parsed input. The second partial data record 806. The second partial data record 806 includes information relating to the type of incident. FIG. 8C illustrates an assembled third partial data record 807 where both the first and second partial episode data records have been assembled into third partial data record pertaining to the insurance claim initiated in response to the first notice of loss. FIG. 8D illustrates a complete episode data record 808 at the end of the episode. As shown in FIG. 8D, all fields within the episode data record have been populated over the course of the episode.

Figure 9A:
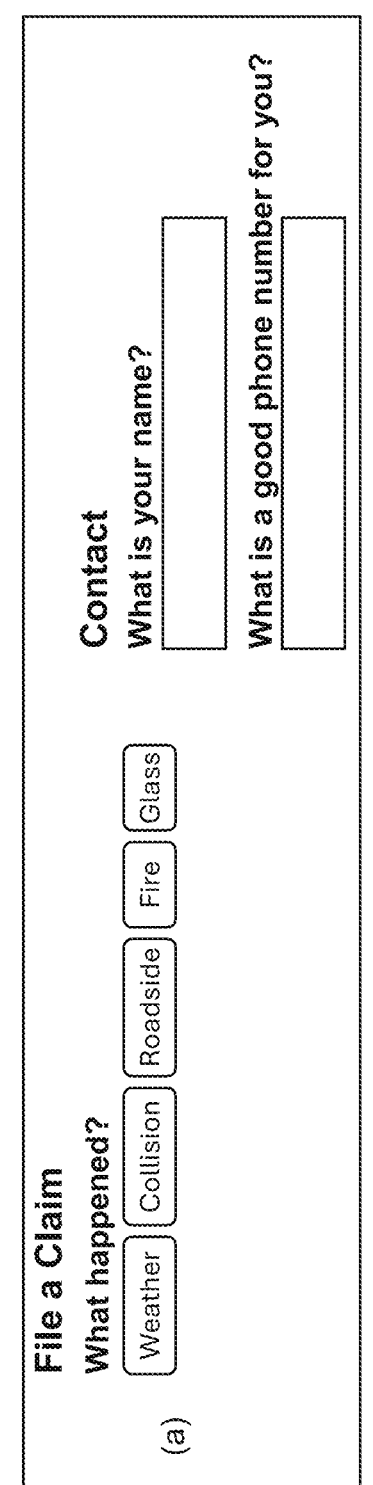
FIGS. 9A, 9B, and 9C illustrate an exemplary user interface for collecting and processing data to assist in the processing of insurance-related tasks in accordance with some embodiments.
Figure 9B:
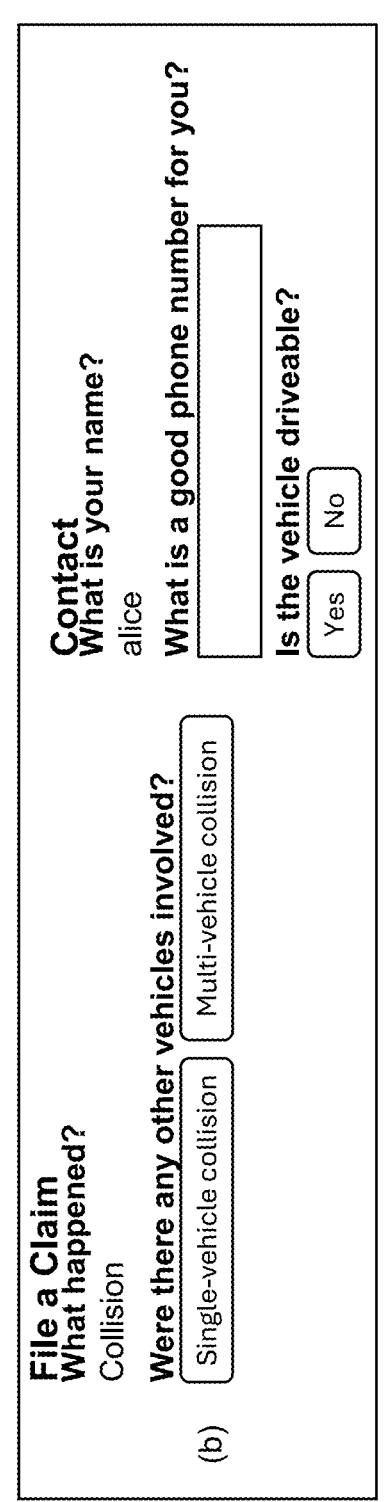
Figure 9C:
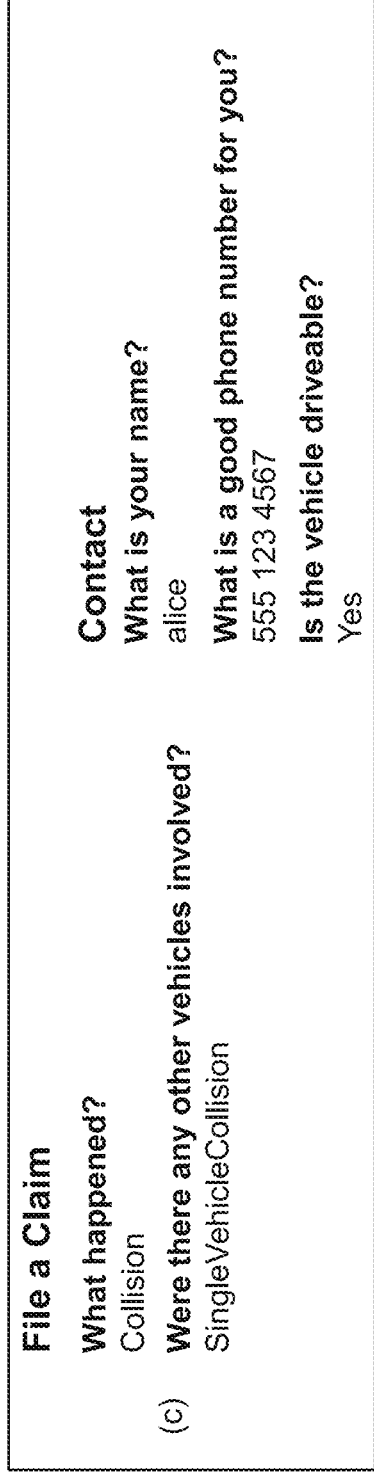

FIGS. 9A, 9B, and 9C illustrate an exemplary user interface 900 relating to filing an insurance claim upon a first notice of loss. The user interface 900 may be used, for example, by a customer service representative at an insurance company to file an insurance claim upon notification of a first notice of loss. FIGS. 9A, 9B, and 9C illustrate the state of user interface 900 at various stages of filing the claim. The user interface 900 is included an electronic user device associated with the representative, for example, at a call center for an insurance company. The user interface 900 is in communication with the data collection and processing system 100 of FIG. 1. The electronic user device also includes a sensor for receiving voice text streams. It should be understood that prompts displayed on the exemplary user interface of FIGS. 9A, 9B, and 9C may be generated as detailed in the method of FIG. 4.

In FIG. 9A, a customer service representative first receives a call from a customer. The customer service representative initiates the call by asking a question: "Thank you for calling, may I have your name?" And the caller answers. These incoming voice stream is received by the sensor in the electronic user devices and is converted to unstructured text data via the voice-to-text module then parsed via the knowledge representation module (see FIGS. 1 and 4 for further detail). Based on the question the representative asks and the response from the caller, information is automatically entered into contact information field in an episode data record that is used to capture data collected from the interaction between the representative and caller. In FIG. 9A, the user interface 900 is also dynamically updated to reflect the field that has been populated in an episode data record (i.e., "Alice" is displayed). Additionally, the system again analyses the episode data record to a piece of information missing from the episode data record (i.e., a first unpopulated field) and generates a prompt associated with the first unpopulated field. The prompt in FIG. 9A displays the prompt associated with the first unpopulated field—"What happened?"

In FIG. 9B, based on the "What happened?" prompt, the representative asks the question "What happened?" and the caller responds "I crashed my car." Based on this question and response, the system automatically determines that there was a collision the enters "Collision" into the first unpopulated field in the episode data record. In FIG. 9B, the system dynamically updates user interface 900 to reflect the field that has been populated in an episode data record (i.e., "Collision" is displayed). After populating the first unpopulated field, the system again analyzes the episode data record to determine another piece of information missing from the episode data record (i.e., a second unpopulated field) and generates a prompt associated with the second unpopulated field—"Were there any other vehicles involved?"

In FIG. 9C, based on the "Were there any other vehicles involved?" prompt, the representative asks the question "Were any other cars involved?" and the caller responds "No." Based on the question and response, the system automatically determines that there was a single vehicle collision and enters "Collision" into the second unpopulated field in the episode data record. In FIG. 9C, the system dynamically updates user interface 900 to reflect the field that has been populated in the episode data record (i.e., "Single vehicle collision" is displayed).

It is contemplated that a wide variety of fields and prompts could be presented via user interface 900, as determined by the particular task for with the user interface is used, in addition to those discussed above with reference to FIGS. 9A, 9B, and 9C.

Figure 10:
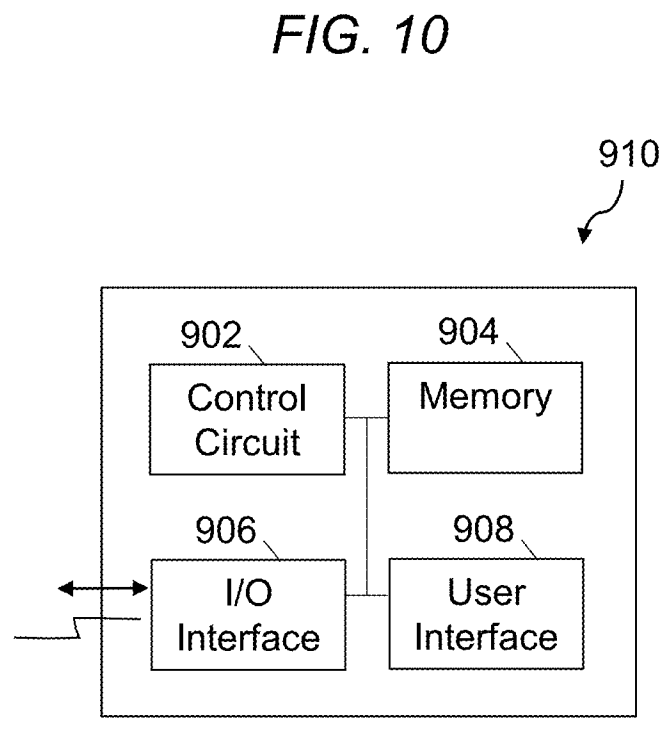

The methods, techniques, systems, devices, services, servers, sources and the like described herein may be utilized, implemented and/or run on many different types of devices and/or systems. Referring to FIG. 10, there is illustrated a system 910 that may be used for any such implementations, in accordance with some embodiments. One or more components of the system 910 may be used to implement any system, apparatus or device mentioned above, or parts of such systems, apparatuses or devices, such as for example any of the above or below mentioned control circuits, electronic user devices, sensor(s), databases, parts thereof, and the like. However, the use of the system 910 or any portion thereof is, certainly not required.

By way of example, the system 910 may include one or more control circuits 902, memory 904, input/output (I/O) interface 906, and/or user interface 908. The control circuit 902 typically comprises one or more processors and/or microprocessors. The memory 904 stores the operational code or set of instructions that is executed by the control circuit 902 and/or processor to implement the functionality of the systems and devices described herein, parts thereof, and the like. In some embodiments, the memory 904 may also store some or all of particular data that may be needed to assist with collecting and processing data to assist with one or more insurance-related tasks.

It is understood that the control circuit 902 and/or processor may be implemented as one or more processor devices as are well known in the art. Similarly, the memory 904 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 904 is shown as internal to the system 910; however, the memory 904 can be internal, external or a combination of internal and external memory. The system 910 also may include a database (not shown in FIG. 10) as internal, external, or a combination of internal and external to the system 910. Additionally, the system typically includes a power supply (not shown), which may be rechargeable, and/or it may receive power from an external source. While FIG. 10 illustrates the various components being coupled together via a bus, it is understood that the various components may actually be coupled to the control circuit 110 and/or one or more other components directly.

Generally, the control circuit 902 and/or electronic components of the system 910 can comprise fixed-purpose hard-wired platforms or can comprise a partially or wholly programmable platform. These architectural options are well known and understood in the art and require no further description here. The system and/or control circuit 902 can be configured (for example, by using corresponding programming as will be well understood by those skilled in the art) to carry out one or more of the steps, actions, and/or functions described herein. In some implementations, the control circuit 902 and the memory 904 may be integrated together, such as in a microcontroller, application specification integrated circuit, field programmable gate array or other such device, or may be separate devices coupled together.

The I/O interface 906 allows wired and/or wireless communication coupling of the system 910 to external components and/or or systems. Typically, the I/O interface 906 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 908 may be used for user input and/or output display. For example, the user interface 908 may include any known input devices, such one or more buttons, knobs, selectors, switches, keys, touch input surfaces, audio input, and/or displays, etc. Additionally, the user interface 908 include one or more output display devices, such as lights, visual indicators, display screens, etc. to convey information to a user, such as but not limited to communication information, instructions regarding unloading of the delivery vehicle, status information, order information, delivery information, notifications, errors, conditions, and/or other such information. Similarly, the user interface 908 in some embodiments may include audio systems that can receive audio commands or requests verbally issued by a user, and/or output audio content, alerts and the like.

It is contemplated that the systems and methods described herein may be used in a variety of insurance-related tasks or processes. In addition to the examples described above, the following examples illustrate other exemplary applications (e.g., APIs for the knowledge execution module) that may leverage the systems and methods described herein.

In one example, the systems and methods described herein may be used to provide real-time assistance to an agent, representative, or other employee. When an agent is writing, creating, or modifying a policy, the agent may need to access various pieces of institutional knowledge. Examples of such knowledge include available coverages, endorsements, limits, deductibles, discounts. This knowledge is in periodically updated by the insurance provider. Difficulty accessing this knowledge may interrupt or delay the policy creation process. This knowledge may be represented by the knowledge representation modules described herein and accessed by the agent by an API via the methods described herein. Specifically, the systems and methods described herein may be used to assist an agent in real-time when creating, modifying, or writing a policy. For example, the systems and methods may be used to send prompts with relevant information or suggest next steps.

In another example, the systems and methods described herein may be used to provide real-time assistance to a representative at a call center. A policyholder may call the corporate call center with questions relating to their policy, for example, to determine whether they are eligible for certain discounts, what deductibles or coverage limits are available for a given coverage, or the date a new endorsement will be available in their state. Given the complexity of underlying business rules and the many combinations of coverage type, state, vehicle types etc., in most cases representatives may need to consult reference sources to determine the answers. The information needed to answer such question may be dispersed across numerous systems each with their own search and retrieval portals and, thus, may be inefficient to retrieve. This may lead to longer call times, unanswered questions, a steeper learning curve for new representatives, and customer frustrations. Such business rules, information, and references sources may be extracted from the various systems and housed in a knowledge representation module and accessed by a representative via the methods described herein.

In another example, the systems and methods described herein may be used to provide a conversational agent for insurance agents or customer assistance. Although machine learning may be used to recognize a user's intent and retrieve the relevant information or execute an appropriate task, the logic for such applications may be difficult to maintain. For example, when the maintenance for an application involves both content curation and programming logic, such an application may be difficult to maintain (See. FIG. 2B). The systems and methods described herein may be used to provide dynamic conversational agents driven by the knowledge representation module. As illustrated in FIG. 2A, the systems and address the maintenance problem by separating out the content and logic as the logic for the conversational agent application. The content and logic may be is derived from the data structures stored in the knowledge graph (e.g., Taxonomies, Data Models, Business Rules) and may be accessed via conversational agent application. In line with the methods described herein, content curators may maintain the content rather than the logic associated with the conversational agent application.

In another example, the systems and methods provided herein may be used to provide automatic linkage between loss cause associated with an insurance claim and contract clause activation. An insurance contract is a document representing the agreement between an insurance company and the insured. It specifies in detail the risks that are covered, the limits and terms of the policy, requirements, conditions, limitations and exclusions. Insurance contracts contain rules that govern the execution of the products offered to customer by insurance providers. Claims or losses paid by insurance providers may be a linked to a part or clause of a corresponding insurance contract. Linking insurance- or claims-related losses to contract sections may help to quantitatively understand the contribution of each clause to the annual company losses. It is contemplated that this may help an insurance provider understand which coverages have to be changed or adjusted to minimize losses while serving customers efficiently. The systems and methods provided herein may be used to represent the insurance contract as a knowledge representation module or knowledge graph including the clauses that relate declarations, definitions, Insuring agreements, covered perils, risks assumed, exclusions, and conditions. Once such knowledge is established in a knowledge representation module, claims causes may be linked particular clauses in the contract and used to identify parts of the contracts that result in large losses. An insurance provider may then modify contracts to add exclusions, change deductibles, or in other in ways that may reduce incurred losses for new contracts.

In one example, the systems and methods described herein may also be used to assist with reference manual searching. For example, when an employee or other individual needs to find company knowledge about products, procedures, protocols, etc. the employee may need to search multiple sources including reference manuals, intranet sites, and corporate glossaries. When a change is made in one such source system, it may impact another system and may—thus, it may be labor intensive to propagate such changes throughout all systems. Further, if such changes are not propagated, that may impair the ability of an employee to retrieve accurate and current information. The systems and methods provided herein may be used to synchronize and link rules, information, and knowledge across all systems. Such linkage may be achieved via the knowledge representation module described herein.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of operating a system including an electronic user device having user interface and an audio sensor, the method comprising, by a processor communicatively coupled to the user interface and to a knowledge representation module having a plurality of parsing algorithms:

receiving information from a plurality of business applications;

generating a knowledge graph based at least in part on the information, the knowledge graph defining a schema for a complete episode data record;

providing a prompting interface for a plurality of application programming interfaces (APIs) on the user interface based on the knowledge graph, wherein the prompting interface is driven by the knowledge graph;

creating an episode data record in an incident database regarding a particular incident;

receiving a first unstructured text data input via the prompting interface regarding the particular incident;

parsing the first unstructured text data input to extract a first structured data input via the knowledge representation module;

automatically creating a first partial data record upon receiving the first unstructured text data input, the first partial data record including the first structured data input;

receiving an audio data input regarding the particular incident via the audio sensor in communication with the processor, converting the audio data input to a second unstructured text data input via at least one speech-to-text module in communication with the audio sensor, parsing the second unstructured text data input to extract a second structured data input via the knowledge representation module;

automatically creating a second partial data record upon receiving the audio data input, the second partial data record including the second structured data input;

merging the first partial data record and the second partial data record into the episode data record;

automatically analyzing the episode data record via the knowledge graph of the knowledge representation module to determine whether the episode data record is complete, the analyzing including comparing data of the episode data record with the schema for the complete episode data record;

upon determining that the episode data record is not complete, identifying a piece of missing information for the episode data record based on the analyzing of the episode data record via the knowledge graph;

dynamically updating the prompting interface in real-time with a prompt to acquire the piece of missing information based on the episode data record and the schema;

updating the episode data record with information received in response to the prompt;

receiving a correction indicative of an identified mistake in the episode data record influenced by a structure of the knowledge graph;

identifying a restructuring operation for the knowledge graph via a machine learning algorithm based on the correction, the restructuring operation including one or more of a change to a schema, taxonomy, node hierarchy, or type hierarchy of the knowledge graph; and updating the knowledge graph in accordance with the restructuring operation.

2. The method of claim 1 wherein the knowledge graph is a graph-structured data model storing a plurality of entities, entity properties, and relationships therebetween, and wherein the plurality of entities include at least one of objects, events, or individuals.

3. The method of claim 1 wherein the machine learning algorithm is configured to identify the restructuring operation based on an error in the episode data record.

4. The method of claim 1 further comprising:

displaying the first structured data input on the prompting interface;

receiving at least one change to the first structured data input via the prompting interface; and updating the episode data record to reflect the at least one change to the first structured data input.

5. The method of claim 1 further comprising:

receiving at least one change to the first structured data input via the prompting interface;

storing the at least one change to the first structured data input in a training data set for at least one machine learning algorithm;

performing machine learning via the machine learning algorithm using the training data set to identify a change to at least one parsing algorithm of the plurality of parsing algorithms in the knowledge representation module; and updating in real time the at least one parsing algorithm in the knowledge representation module based on the change.

6. The method of claim 1 further comprising:

analyzing the episode data record via the knowledge representation module to determine whether data is missing from the episode data record; and upon determining data is missing from the episode data record, sending the prompt to the prompting interface, the prompt requesting a user to input missing data.

7. The method of claim 1 wherein the prompt includes at least one of plain text, rich text, a discrete selector, a button, a check-box, a constrained value, an image, an audio message, or a video.

8. The method of claim 1 wherein the prompt presents a discrete selection via the prompting interface.

9. The method of claim 1 wherein the prompt requests input of unstructured text via at least one of the prompting interface.

10. The method of claim 1 wherein the prompt includes a question displayed via the prompting interface, and wherein the method further includes receiving a second audio data input in response to displaying the question.

11. The method of claim 1 further comprising:

linking the first unstructured text data input to a first node in at least one schema in the knowledge representation module;

querying the knowledge representation module to identify at second node in the at least one schema; and sending a prompt requesting information associated with the second node in the at least one schema.

12. The method of claim 1 further comprising:

receiving a third structured data input via the prompting interface;

creating a third partial data record including the third structured data input; and assembling the third partial data record into the episode data record.

13. The method of claim 12 wherein the third structured data input includes text into a form displayed via the prompting interface.

14. The method of claim 13 wherein the third structured data input is received from a database in communication with the processor.

15. The method of claim 1 further comprising storing the episode data record in a database.

16. The method of claim 1 wherein the episode data record is associated with a first notice of loss associated with an insurance claim.

17. The method of claim 1 wherein the first unstructured text data input includes information relating to at least one of a type of insurance claim, an insured asset, or an insured party.

18. The method of claim 1 wherein the knowledge representation module includes data representing at least one taxonomies, controlled vocabularies, data models, business rules, or business protocols.

19. A data collection and processing system configured to assist a data collection agent in collecting information from a third party during an interaction with the third party, the data collection and processing system comprising:

at least one electronic user device having a user interface;

at least one acoustic sensor communicatively coupled to the at least one electronic user device;

at least one knowledge representation module including a plurality of parsing algorithms; and a processor in communication with the at least one electronic user device and the at least one knowledge representation module, the processor configured to:

receive information from a plurality of business applications associated;

generate a knowledge graph based at least in part on the information, the knowledge graph defining a schema for a complete episode data record;

provide a prompting interface for a plurality of application programming interfaces (APIs) on the user interface based on the knowledge graph, wherein the prompting interface is driven by the knowledge graph;

create an episode data record regarding a particular incident;

receive a first unstructured text data input via the prompting interface regarding the particular incident;

parse the first unstructured text data input to extract a first structured data input via the plurality of parsing algorithms;

automatically create a first partial data record upon receiving the first unstructured text data input, the first partial data record including the first structured data input;

receive an audio data input regarding the particular incident via the at least one acoustic sensor, convert the audio data input to a second unstructured text data input via at least one speech-to-text module in communication with the at least one acoustic sensor;

parse the second unstructured text data input to extract a second structured data input via the at least one knowledge representation module;

automatically create a second partial data record upon receiving the audio data input, the second partial data record including the second structured data input;

merge the first partial data record and the second partial data record into the episode data record;

analyze the episode data record via the knowledge graph of the at least one knowledge representation module to determine whether the episode data record is complete, the analyzing including comparing data of the episode data record with the schema for the complete episode data record;

upon determining that the episode data record is not complete, identify a piece of missing information for the episode data record based on the analyzing of the episode data record via the knowledge graph;

dynamically update the prompting interface with a prompt to acquire the piece of missing information based on the episode data record and the schema;

update the episode data record with information received in response to the prompt;

receive a correction indicative of an identified mistake in the episode data record influenced by a structure of the knowledge graph;

identify a restructuring operation for the knowledge graph via a machine learning algorithm based on the correction, the restructuring operation including one or more of a change to a schema, taxonomy, node hierarchy, or type hierarchy of the knowledge graph; and update the knowledge graph in accordance with the restructuring operation.

20. A method of operating a system comprising an electronic user device having a user interface and an audio sensor, the method comprising:

receiving information from a plurality of business applications;

generate a knowledge graph based at least in part on the information, the knowledge graph defining a schema for a complete episode data record;

providing a prompting interface for a plurality of application programming interfaces (APIs) on the user interface based on the knowledge graph, wherein the prompting interface is driven by the knowledge graph;

receiving a first audio input regarding a particular incident, via the audio sensor, the first audio input including a first question;

receiving a second audio input regarding the particular incident via the audio sensor, the second audio input including an answer to the first question;

analyzing the first audio input and the second audio input via a knowledge representation module comprising a plurality of parsing algorithms and the knowledge graph to identify at least one piece of missing information, the analyzing including comparing data of the first audio input and the second audio input with the schema for a complete data collection record;

populating at least one field in a data collection record based on the analyzing of the first audio input and the second audio input;

generating a prompt based on the analysis of the first audio input and the second audio input, the prompt including a second question associated with the at least one piece of missing information;

dynamically updating the prompting interface with the prompt;

receiving a correction indicative of an identified mistake in the data collection record influenced by a structure of the knowledge graph;

identifying a restructuring operation for the knowledge graph via a machine learning algorithm based on the correction the restructuring operation including one or more of a change to a schema, taxonomy, node hierarchy, or type hierarchy of the knowledge graph; and updating the knowledge graph in accordance with the restructuring operation.

\* \* \* \* \*